Feb. 8, 1966 M. N. GLICKMAN 3,234,438

HEADER FOR HERMETICALLY SEALED ELECTRONIC COMPONENTS

Filed July 10, 1961

INVENTOR.
MANNES N. GLICKMAN

BY Philip S. Hilbert

ATTORNEY.

United States Patent Office 3,234,438

Patented Feb. 8, 1966

3,234,438

HEADER FOR HERMETICALLY SEALED ELECTRONIC COMPONENTS

Mannes N. Glickman, Hollywood, Calif. (4232 Temple City Blvd., Rosemead, Calif.)

Filed July 10, 1961, Ser. No. 122,723
3 Claims. (Cl. 317—234)

This invention relates to transistor housings.

An object of this invention is to provide an improved housing for transistors or other electrical or electronic components which includes improved means for insuring leakproof hermetic sealing of the terminals thereof.

A further object of this invention is to provide a housing of the character described, in which a header for mounting the transistor element, is of a configuration which includes a portion effective to transfer substantial heat quantities given off by the element in use, and also provides for a body of dielectric material in sealing relation to the terminals of the device as to substantially eliminate leakage or breakdown at said terminals.

Another object of this invention is to provide a housing for transistor, diode or the like electronic elements which includes a header having a flush surface for mounting the element thereon in heat transfer relation thereto, the terminals being mounted on the header and adjacent the flush surface thereof to facilitate electrical connections to the mounted element, together with a dielectric body on the header for sealing the terminals over extended surface portions thereof.

Still another object of this invention is to provide a housing of the character described including a header of thick section for mounting a transistor element on a surface portion thereof, the header including a well portion for receiving the terminals of the device and for containing a body of fusible dielectric material for sealing the terminals along extended surface portions thereof to avoid possible leakages or breakdowns at said terminals.

Other objects of this invention will in part be obvious and in part hereinafter pointed out.

In the drawing, FIG. 1 is a top plan view of the header portion of a transistor housing embodying the invention;

Figure 1:
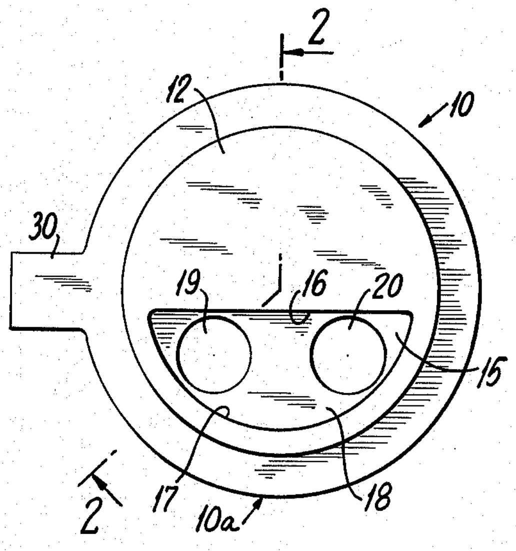
Figure 2:
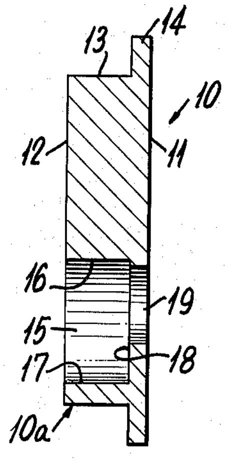
FIG. 2 is a transverse sectional view taken on the line 2—2 of FIG. 1.

Housings for transistors, diodes and the like electronics components, have been progressively miniaturized to allow the same to be used in assemblies where minimized bulk is essential. However, despite such reduction in the volume of the housings, optimum electrical properties must be retained despite limitations of space and materials involved. Particularly, it has been found that with known housings, breakdown frequently occurs at the terminals due to leakage at the dielectric-metal interface.

It has been found that a header of a housing for transistor or diode elements may have a configuration which permits the usage of an increased volume of dielectric material and a distribution of the dielectric material in respect to the terminals, as to insure optimum seals which are proof against breakdown or leakage. Also, such headers provide excellent heat transfer means for dissipating the heat given off by the mounted electrical component, while the device is in use.

Thus, as shown in the drawing, there is provided a header 10 for a transistor housing embodying the invention. The header 10 comprises a metallic body 10A formed of the iron-cobalt alloy known as Kovar, or of other suitable and well known sealing alloys. Body 10A is of selected shape and may be cylindrical, as indicated in the figures, with a bottom wall 11, a top wall 12, a side wall 13 and an annular radial flange 14 extending from bottom wall 11.

Body 10A is of a thickness which permits the formation of a recess 15 of any desired configuration, being shown as of sector shape, for the purpose of illustration. The recess 15 is defined by a planar side wall portion 16; an arcuate side wall portion 17 and a bottom wall 18. Bottom wall 18 is formed with a pair of spaced openings 19, 20 for the purpose hereinafter appearing.

Figures 3, 4:
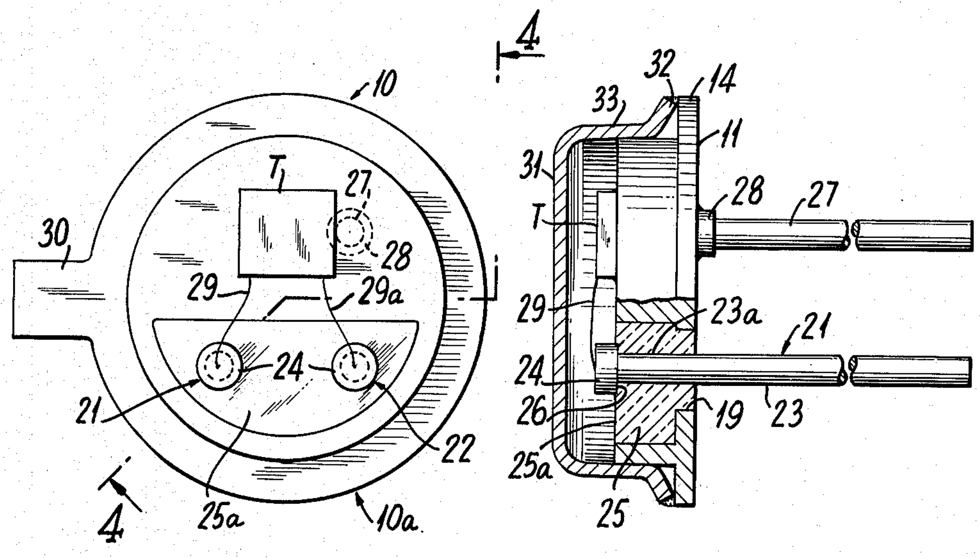
FIG. 3 is a view similar to that of FIG. 1 showing a transistor element and terminal pins in assembled relation to the header portion of the housing.
FIG. 4 is a transverse sectional view taken on the line 4—4 of FIG. 3, and showing the housing cover in place.

As shown in FIGS. 3, 4, a pair of elongated terminal pins 21, 22 formed of a suitable metal alloy and comprising stem portions 23 and head portions 24, are disposed within openings 19, 20 of bottom wall 18 and are sealed in place by a body 25 of vitreous material. The material of body 25 may have an expansion coefficient similar to that of the metal of terminals 21, 22 and header body 10A, or may be otherwise correlated to the metal portions of housing 10, in a manner known to the metal-glass sealing art.

Body 25 fills recess 15 and in the sealing procedure, the vitreous material will flow in a manner to continuously adhere to the extended surface portions 23A of terminals 21, 22 disposed within said recess 15 and openings 19, 20. Also, terminals 21, 22 are so disposed as to bring the undersurface portions of terminal heads 24 flush with the surface 25A of body 25 and thereby further augment the metal-glass interface seal as between said terminals and the body 25.

A third terminal pin 27 is secured directly to the bottom wall 11 of body 10A, as by welding the head 28 thereof to the surface of wall 11.

A transistor element indicated at T is secured directly to top wall 12 of body 10A by brazing or the like, thus establishing one electrical connection thereof, as between the base of said element and terminal 27. Pigtail leads 29, 29A from the usual emitter and collector portions of element T, are secured to the head portions 24 of terminals 21, 22 respectively.

As the body 10A has a thickness which is a multiple of the thickness of flange 14, said body provides excellent heat transfer means for the mounted element T. Also, such body 10A allows for the formation of a relatively deep recess 15 to accommodate vitreous body 25. Such body 25 provides a reservoir of fusible material which flows during the sealing procedure to uniformly and adequately seal to the extended surface portions of terminals 21, 22 at the stem and head portions thereof.

Flange 14 may include a radial tab 30 for registering the position of housing 10, in place, in a manner known in the art. A dished cover 31 formed of a selected metal alloy, such as Kovar or other alloys known in the art, is fitted over the assembly of body 10A and the mounted element T, and the outwardly projecting peripheral lip 32 extending from side wall 33 of said cover 31, is welded to flange 14 of header 10, to complete the housed assembly.

It is understood that element T may be a diode or other electrical or electronic element which is to be hermetically sealed within housing 10. Also, the total number of terminals within recess 15 may be increased or decreased in accordance with the terminal requirements of the element being housed. Of course the number of openings in wall 18 of recess 15 will match the number of terminals.

As various changes might be made in the embodiment herein disclosed without departing from the spirit of the invention, it is understood that all matter shown or described shall be deemed illustrative and not limiting except as set forth in the appended claims.

What is claimed is:

1. A housing for an electronic element comprising a header, said header comprising a relatively thick metal body having a flat surface portion adapted to mount thereon said electronic element and a deeply recessed portion laterally related to said flat surface portion, said recessed portion comprising a bottom wall formed with a plurality of spaced openings in communication with said recess, said recess having a depth equal to a substantial multiple of the thickness of said bottom wall, a metal terminal pin disposed in each opening and projecting on either side of said bottom wall, each pin having a portion thereof within said recessed portion and of a longitudinal extent substantially equal to the depth of said recessed portion, a unitary mass of vitreous material of substantial thickness and lateral extent in the recessed portion of said body and in sealed relation to the wall surfaces of said recess, and the surface portions of said first mentioned pin portion, said mass of vitreous material having an exposed surface portion substantially flush with the flat surface portion of said metal body, and said pins providing connector means for the electronic element mounted on said body surface portion.

2. A housing as in claim 1 wherein each of said pins include a head portion in sealed relation to the exposed surface portion of said vitreous mass.

3. In combination, a transistor housing comprising a header and a transistor element on said header, said header comprising a metal body formed with a deep recess of substantial lateral extent, said metal body having a flat surface portion in lateral relation to said recess, said transistor element being mounted on said surface portion in heat transfer relation thereto and with one electrode of said element in electrically conductive relation to said body, said recess having a bottom wall of a thickness equal to a fraction of the depth of said recess formed with a pair of spaced openings, an elongated metal terminal pin in each opening and having a portion thereof extending through said recess, a vitreous mass within said recess having surface portions thereof in sealed relation to the opposed wall surfaces of said recess and said openings and the surface portions of said pin portions, said pin portions having ends projecting through the exposed surface of said vitreous mass, electrical connections between said pin ends and the remaining respective electrodes of said transistor element, and a third metal terminal pin extending from said metal body and in electrically conductive relation thereto.

References Cited by the Examiner

UNITED STATES PATENTS

| | | | |
|---|---|---|---|
| 1,723,579 | 9/1929 | Ruben | 317—234 |
| 2,905,873 | 9/1959 | Ollendorf et al. | 317—234 |
| 2,975,928 | 3/1961 | Roovers | 317—235 |
| 3,020,454 | 2/1962 | Dixon | 317—235 |
| 3,021,461 | 2/1962 | Oakes et al. | 317—235 |

JAMES D. KELLAM, *Acting Primary Examiner.*

JOHN W. HUCKERT, *Examiner.*

A. S. KATZ, J. D. CRAIG, *Assistant Examiners.*